US006376922B1

(12) United States Patent
Lake

(10) Patent No.: US 6,376,922 B1
(45) Date of Patent: Apr. 23, 2002

(54) RADIO FREQUENCY-TRANSMISSIVE COMPOSITIONS, METHODS OF FORMING RADIO FREQUENCY-TRANSMISSIVE COMPOSITIONS, MICROELECTRONIC DEVICES WIRELESS RADIO FREQUENCY COMMUNICATION DEVICES, AND METHODS OF FORMING MICROELECTRONIC DEVICES, WIRELESS RADIO FREQUENCY COMMUNICATION DEVICES

(75) Inventor: Rickie C. Lake, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/525,567

(22) Filed: Mar. 15, 2000

Related U.S. Application Data

(62) Division of application No. 08/911,309, filed on Aug. 14, 1997, now Pat. No. 6,114,447.

(51) Int. Cl.$^7$ .......................... H01L 23/29; H01L 21/47; H01L 21/48; H01L 21/56; B05D 5/12
(52) U.S. Cl. ...................... 257/789; 438/106; 438/125; 438/126; 438/758; 438/127; 427/96; 427/385.5; 257/787; 257/793; 257/795
(58) Field of Search ........................... 438/106, 125, 438/126, 127, 758; 427/96, 385.5; 257/789, 787, 793, 795

(56) References Cited

U.S. PATENT DOCUMENTS

| 4,075,632 A | | 2/1978 | Baldwin et al. ............. 343/6.8 |
| 4,472,556 A | | 9/1984 | Lipowitz et al. ............. 525/446 |
| 4,926,182 A | | 5/1990 | Ohta et al. ..................... 342/44 |
| 4,990,556 A | | 2/1991 | Shimizu et al. .............. 525/105 |
| 5,019,604 A | | 5/1991 | Lemole ....................... 523/105 |
| 5,378,403 A | * | 1/1995 | Shacklette ................... 252/500 |
| 5,617,297 A | * | 4/1997 | Lo et al. ....................... 361/737 |
| 5,621,412 A | | 4/1997 | Sharpe et al. .................. 342/51 |
| 5,649,296 A | | 7/1997 | MacLellan et al. ........ 455/38.2 |
| 5,725,707 A | * | 3/1998 | Koon et al. .................. 156/157 |

* cited by examiner

Primary Examiner—Robert Dawson
Assistant Examiner—Jeffrey B. Robertson
(74) Attorney, Agent, or Firm—Wells St. John P.S.

(57) ABSTRACT

Radio frequency-transmissive compositions having reduced dissipation factors, microelectronic devices, and in particular, wireless radio frequency communication devices which utilize such compositions, and methods of forming the same are described. In one implementation, a liquid resin is provided and a solid organic polymer filler material is provided within the resin to impart a degree of radio frequency transmissivity which is greater than that of the resin alone, i.e. the composition has a reduced dissipation factor. An exemplary resin comprises epoxy and an exemplary filler material is a polytetrafluoroethylene powder. In another implementation, such composition is formed or applied over a substrate which includes an antenna formed thereon and cured to provide a solid coating. The substrate can also have integrated circuitry and a battery mounted thereon to provide a wireless communication device. In such a case, the composition can be formed over and cured atop the integrated circuitry and the battery.

39 Claims, 2 Drawing Sheets

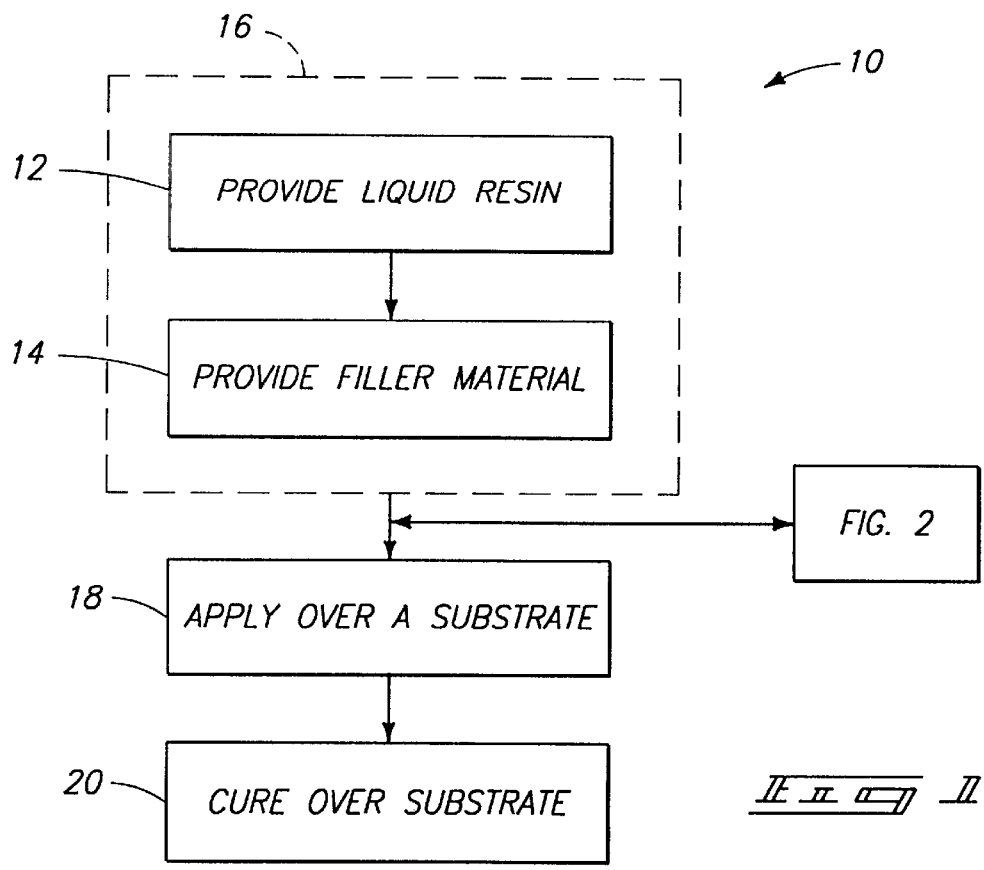
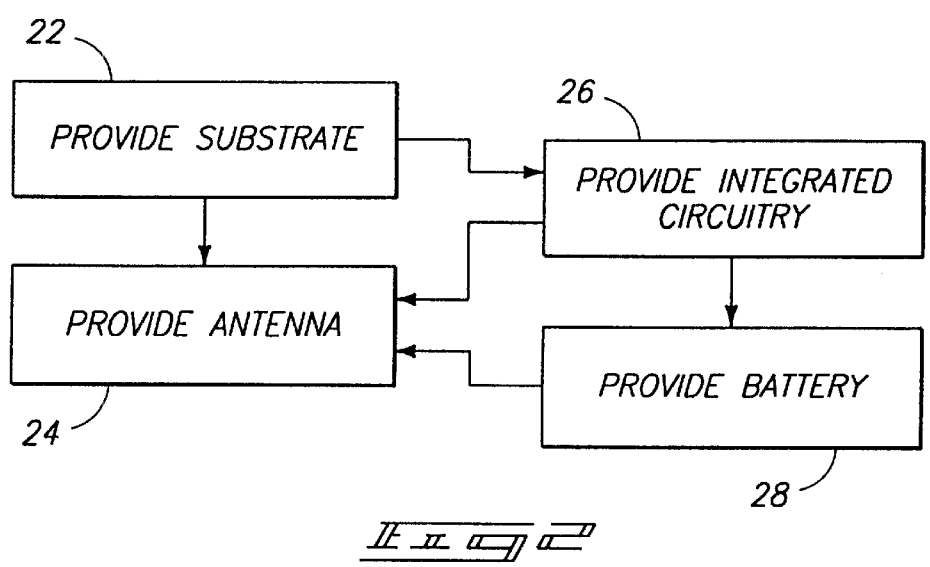

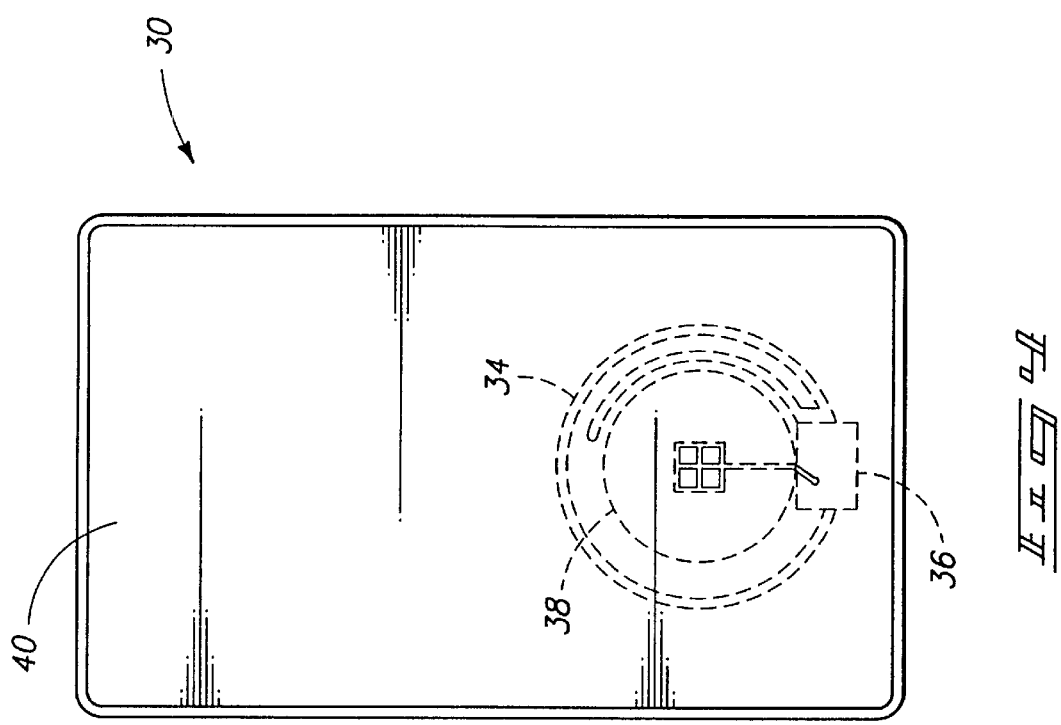
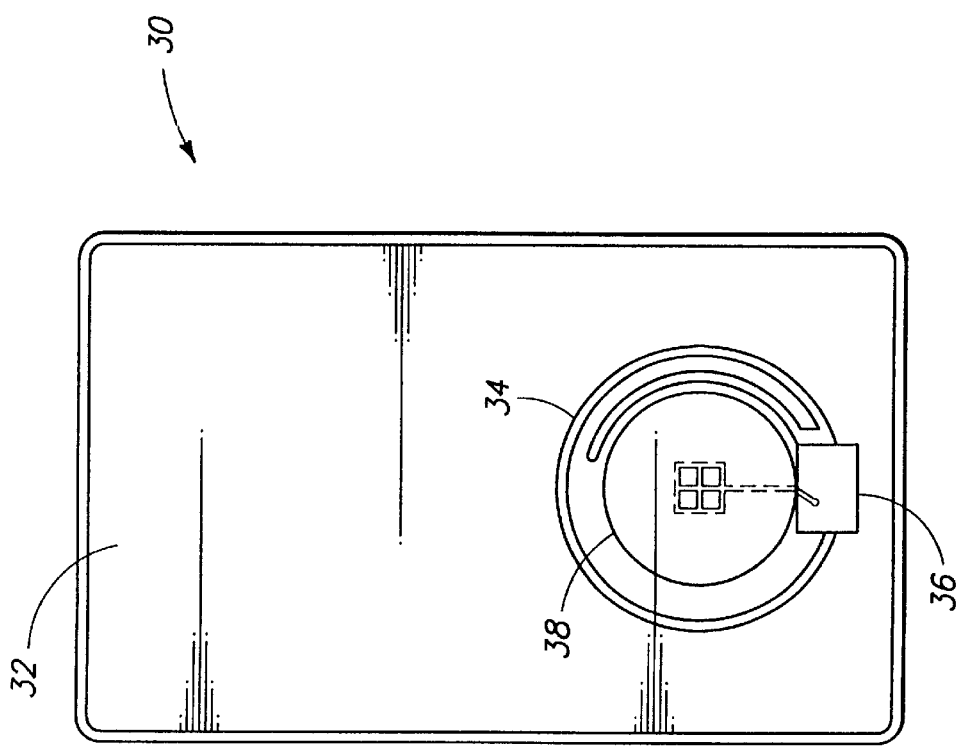

US 6,376,922 B1

RADIO FREQUENCY-TRANSMISSIVE COMPOSITIONS, METHODS OF FORMING RADIO FREQUENCY-TRANSMISSIVE COMPOSITIONS, MICROELECTRONIC DEVICES WIRELESS RADIO FREQUENCY COMMUNICATION DEVICES, AND METHODS OF FORMING MICROELECTRONIC DEVICES, WIRELESS RADIO FREQUENCY COMMUNICATION DEVICES

This is a divisional application of U.S. patent application Ser. No. 08/911,309, filed Aug. 14, 1997, which is now U.S. Pat. No. 6,114,447, the disclosure of which is incorporated by reference.

TECHNICAL FIELD

This invention relates to radio frequency-transmissive compositions having reduced dissipation factors and methods of forming the same. The invention also concerns microelectronic devices, and in particular, wireless radio frequency communication devices which utilize such compositions, and methods of forming the same.

BACKGROUND OF THE INVENTION

Some microelectronic devices are designed for wireless communication. Typically, such devices operate within a desired range of radio frequencies. In designing such devices, consideration must be given to the various materials which are utilized because of their potential to adversely impact device operation and performance. For example, some wireless microelectronic devices include antennas which are utilized to send and receive electronic signals which fall within the desired range of frequencies. These antennas can be covered with a material which serves to protect the antenna from the external environment. Yet in protecting the antenna, such materials by virtue of their physical characteristics may undesirably affect the ability of the device (and antenna) to transmit and receive electronic signals within the desired range of radio frequencies, i.e. such material may cause the signals to be attenuated or undesirably dissipated. Such materials can also affect the electromagnetic characteristics of such antennas such as the antenna's resonant frequency.

Some microelectronic communication devices are very small and can be covered with a protectant which effectively seals the device. As with those materials which can adversely affect an antenna's operation by covering all or a portion thereof, such protectants can also have an impact on overall device operation. Thus it is not enough to select a protectant which only serves to protect or seal the device. Rather, the designer must consider all of the operation-impacting ramifications of a particular material when it is selected for use with a particular device.

This invention arose out of concerns associated with providing materials and methods of forming materials which have desirable radio-frequency characteristics. This invention also arose out of concerns associated with providing microelectronic devices, and in particular, wireless radio frequency communication devices which utilize such materials, and methods of forming the same.

SUMMARY OF THE INVENTION

Radio frequency-transmissive compositions having reduced dissipation factors, microelectronic devices, and in particular, wireless radio frequency communication devices which utilize such compositions, and methods of forming the same are described. In one implementation, a liquid resin is provided and a solid organic polymer filler material is provided within the resin to impart a degree of radio frequency transmissivity which is greater than that of the resin alone, i.e. the composition has a reduced dissipation factor. An exemplary resin comprises epoxy and an exemplary filler material is a polytetrafluoroethylene powder. In another implementation, such composition is formed or applied over a substrate which includes an antenna formed thereon and cured to provide a solid coating. The substrate can also have integrated circuitry and a battery mounted thereon to provide a wireless communication device. In such a case, the composition can be formed over and cured atop the integrated circuitry and the battery.

BRIEF DESCRIPTION OF THE DRAWINGS

Preferred embodiments of the invention are described below with reference to the following accompanying drawings.

FIG. 1 is a flow diagram which illustrates certain methodical aspects of the invention.

FIG. 2 is a flow diagram which illustrates certain methodical aspects of the invention.

FIG. 3 is a top plan view of a wireless communication device constructed in accordance with one aspect of the present invention.

FIG. 4 is a top plan view of the FIG. 3 device at a processing step subsequent to that shown in FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Referring to FIG. 1, a flow diagram illustrates certain methodical aspects of the invention generally at 10. A liquid resin or encapsulating material which is radio frequency transmissive to a first degree is provided at 12. Such resin has a first radio frequency dissipation factor. Exemplary resins include various epoxies, urethane, acrylic, polyester, and/or silicone. The resin can also include a hardener. As used in this document, the term "resin" will be understood to include resins, such as those mentioned above, which may or may not include a hardener or hardening agent. An exemplary epoxy resin is R3500 available from Epic Resins, Inc. of Palmyra, Wisconsin. An exemplary Epic Resin hardener is H5039. The hardener can also comprise a pre-blended hardener having constituent parts of Epic Resin H5064 (25%) and K2400 (75%). Another exemplary resin is Grace Specialty Polymers Stycast® # 1267 which is available through W.R. Grace & Co. of Atlanta, Ga.

Filler material is provided into or within the liquid resin at 14 to form a resin composition at 16 which is radio frequency transmissive to a second degree which is greater than the first degree. Accordingly, the resin composition has a second radio frequency dissipation factor which is less than the first dissipation factor. In a preferred implementation, such filler material constitutes a solid, such as an organic polymer powder which is provided into the liquid resin in solid form and constitutes a plurality of particles which are suspended therewithin. Such suspended particles can have exemplary sizes from between 1–25 $\mu$m.

Exemplary materials for the organic polymer filler include the following: polytetrafluoroethylene, fluorinated ethylene propylene, polypropylene, polystyrene, and/or polybutylene, with powdered polytetrafluoroethylene being preferred. An exemplary powdered polytetrafluoroethylene material is MP1100 Teflon® powder which is available from DuPont. The manufacturer of the resin could of course supply the filler material premixed in the resin, hardener, or resin/hardener composition.

The preferred resin composition or liquid mixture (pre-cure) preferably comprises between about 10% to 90% by volume of the organic polymer filler material and even more preferably, between about 40% to 70%. Such provides a flowable mixture which is formed or applied at 18 over a suitable substrate, an exemplary one of which is described in more detail below in connection with FIG. 2. An exemplary flowable mixture comprises the Epic Resin resin R3500 with a pre-blended hardener having constituent parts of Epic Resin hardener H5064 (25%) and K2400 (75%), with a 14% by-weight concentration of the DuPont MP1100 Teflon® powder. Thereafter, such flowable mixture can be exposed to conditions at 20 which are effective to harden the flowable mixture into a solid mass or rigidified coating thereover.

Referring to FIG. 2, a substrate is provided at 22. An exemplary substrate comprises a polyester film having a thickness of around 5 mils. An antenna is provided over or on the substrate at 24. In a preferred embodiment, such antenna is formed from conductive antenna-forming material which is printed on the substrate. Such antenna-forming material can constitute any suitable conductive material, with an exemplary material being a silver-filled material. Integrated circuitry can also be provided over or mounted on the substrate and operably connected with the antenna at 26. The integrated circuitry can be configured for radio frequency operation within a desired range of frequencies. In one aspect, the integrated circuitry constitutes at least one circuit comprising a radio frequency receiver and transmitter. A battery can also be provided at 28 and supported by the substrate. Such battery is preferably operably connected with the integrated circuitry to provide power thereto.

Referring to FIG. 3, an exemplary micro electronic radio frequency communication device is shown at 30 and includes a substrate 32 and an antenna 34 which is formed thereover as discussed above. Integrated circuitry, in the form of a semiconductor chip 36, is mounted on and supported by substrate 32. Antenna 34 is operably connected with semiconductor chip 36 and configured therewith to operate relative to desired radio frequencies. A exemplary range of frequencies can be between 1 GHz and 30 GHz. More preferably, the desired frequency of operation is about 2.45 GHz. A battery 38 is provided and supported relative to substrate 32. Accordingly, such substrate constitutes a common substrate which supports chip 36, antenna 34, and battery 38. An exemplary microelectronic radio frequency communication device is disclosed in U.S. patent application Ser. No. 08/705,043, now U.S. Pat. No. 6,130,602 which names James O'0 Toole, John R. Tuttle, Mark E. Tuttle, Tyler Lowrey, Kevin Devereaux, George Pax, Brian Higgins, Shu-Sun Yu, David Ovard and Robert Rotzoll as inventors, which was filed on Aug. 29, 1996, and is assigned to the assignee of this patent application.

Referring to FIG. 4, a liquid mixture or filled resin composition is provided as described above, and formed or coated over at least a portion of, and preferably the entirety of antenna 34, chip 36, and battery 38. Such is then cured into a solid mass or coating 40. In a preferred aspect, the curing is conducted at a temperature less than or equal to about 120° C. Even more preferred, in a communication system which incorporates a battery, lower curing temperatures of between about 40° C. and 80° C. could be utilized to reduce the possibility of adversely affecting battery electrolyte material, some of which can boil at temperatures above 92° C.

The above described coating compositions provide a desired degree of radio frequency transmissivity such that when incorporated into wireless communication devices, less of a radio frequency signal is dissipated than would otherwise be possible without the composition. Such is desirable from the standpoint of preserving the integrity and/or strength of a particular signal. For example, some wireless communication devices can utilize microwave backscatter as a means of communicating between separated locations. Having such a device encapsulated with a material which is formed in accordance with the invention can increase the efficiency with which a signal is passed to and from the device.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a microelectronic device comprising:
   providing integrated circuitry supported by a substrate;
   providing a liquid resin having an organic polymer filler material therein, wherein the organic polymer filler material is solid as provided within the liquid resin and wherein the organic polymer filler material comprises a polymer powder;
   applying the resin having the organic polymer filler material over at least a portion of the substrate and integrated circuitry; and
   curing the applied resin into a solid mass.

2. The method of claim 1, wherein the organic polymer filler material comprises polytetrafluoroethylene.

3. The method of claim 1, wherein the organic polymer filler material includes at least one of the following: polytetrafluoroethylene, fluorinated ethylene propylene, polypropylene, polystyrene, and polybutylene.

4. The method of claim 1, wherein the liquid resin includes at least one of the following: epoxy, urethane, acrylic, polyester, and silicone.

5. The method of claim 1, wherein the liquid resin comprises between about 10% and 90% by volume of the organic polymer filler material.

6. The method of claim 1, wherein the liquid resin comprises between about 40% and 70% by volume of the organic polymer filler material.

7. The method of claim 1, wherein the curing of the applied resin is conducted at a temperature less than or equal to 120° C.

8. The method of claim 1, further comprising:
   providing an antenna on the substrate; and
   operably connecting the antenna and the integrated circuitry to provide a device configured for RF operation.

9. A method of forming a microelectronic device comprising:

providing a liquid encapsulating material having a first RF-associated dissipation factor;

mixing a filler material having a second RF-associated dissipation factor which is less than the first RF-associated dissipation factor into the liquid encapsulating material to provide a liquid mixture having an effective RF-associated dissipation factor which is less than the first RF-associated dissipation factor;

applying the liquid mixture over a substrate having microelectronic circuitry configured for RF operation thereon; and curing the liquid mixture into a solid coating.

10. The method of claim 9, wherein the filler material having the second RF-associated dissipation factor comprises a solid.

11. The method of claim 9, wherein the liquid encapsulating material comprises an epoxy.

12. The method of claim 11, wherein the liquid encapsulating material comprises a hardener.

13. The method of claim 9, wherein the filler material having the second RF-associated dissipation factor comprises an organic polymer powder.

14. The method of claim 13, wherein the organic polymer powder comprises polytetrafluoroethylene.

15. The method of claim 9, wherein the applying of the liquid mixture comprises covering the microelectronic circuitry therewith.

16. A method of forming a microelectronic radio frequency communication device comprising:

providing integrated circuitry and an antenna operably connected therewith and configured to transmit and receive radio frequency signals;

providing a liquid polymer resin having a first radio frequency dissipation factor and an organic polymer powder therewithin having a second radio frequency dissipation factor which is less than the first radio frequency dissipation factor;

coating at least a portion of the antenna and the integrated circuitry with the liquid polymer resin having the polymer powder therewithin; and curing the coated liquid polymer resin having the polymer powder to form a solid coating having a radio frequency dissipation factor which is less than the first radio frequency dissipation factor.

17. The method of claim 16, wherein the coating comprises coating the entire antenna with the liquid polymer resin having the polymer powder therewithin.

18. The method of claim 16, wherein the providing of the integrated circuitry and the antenna comprises:

printing conductive antenna-forming material on a substrate; and mounting an integrated circuitry chip on the substrate.

19. The method of claim 18, wherein the coating comprises coating the entire antenna with the liquid polymer resin having the polymer powder therewithin.

20. The method of claim 16, wherein the liquid polymer resin comprises an epoxy.

21. The method of claim 16, wherein the polymer powder comprises polytetrafluoroethylene.

22. The method of claim 16, wherein the liquid polymer resin and the polymer powder comprise a liquid mixture having, before the curing, between about 10% to 90% by volume of the polymer powder.

23. The method of claim 16, wherein the liquid polymer resin and the polymer powder comprise a liquid mixture having, before cure, between about 40% to 70% by volume of the polymer powder.

24. The method of claim 16, wherein the curing comprises curing the coated liquid polymer resin having the polymer powder at a temperature of less than or equal to 120 C.

25. A method of forming a microelectronic radio frequency communication device comprising:

supporting a semiconductor chip, at least one antenna, and a battery relative to a common substrate; the chip, antenna, and battery being operably interconnected and configured to operate relative to at least one desired radio frequency;

forming a flowable mixture comprising a resin and at least one organic polymer filler material suspended therewithin, the one filler material being frequency-transmissive to a desired degree relative to said at least one desired radio frequency; and forming the flowable mixture over at least a portion of the device and thereafter exposing the flowable mixture to conditions which are effective to harden the flowable mixture into a solid coating thereover.

26. The method of claim 25, wherein the at least one desired frequency comprises a frequency in a range between 1 GHz and 30 GHz.

27. The method of claim 25, wherein the at least one desired frequency is about 2.45 GHz.

28. The method of claim 25, wherein the at least one organic polymer filler material comprises a polymer powder.

29. The method of claim 28, wherein the polymer powder comprises polytetrafluoroethylene.

30. The method of claim 28, wherein the resin comprises an epoxy.

31. The method of claim 28, wherein the forming of the flowable mixture comprises forming the mixture over the entire antenna.

32. The method of claim 28, wherein the forming of the flowable mixture comprises forming the mixture over the entire device.

33. A method of forming a microelectronic communication device comprising:

supporting a semiconductor chip relative to a substrate;

supporting an antenna relative to the substrate, the antenna being operably connected with the chip and configured therewith to operate relative to at least one desired radio frequency; and covering the chip and substrate with a rigidified coating of material having a plurality of organic polymeric particles suspended therewithin, said particles imparting a degree of frequency transmissivity to the coating relative to said at least one desired radio frequency which is higher than the coating would have without said organic polymer particles.

34. The method of claim 33, further comprising:

prior to the covering of the chip and substrate, forming a liquid mixture comprising the organic polymeric particles; and wherein the covering of the chip and substrate comprises curing the liquid mixture over the chip and substrate.

35. A microelectronic radio frequency communication device comprising:

a substrate;

a semiconductor chip supported by the substrate;

at least one antenna supported by the substrate and operably connected with the semiconductor chip, the antenna and the chip configured to operate relative to a desired radio frequency;

a battery supported by the substrate and operably connected with the semiconductor chip; and a solid coating of material disposed over the antenna, the solid coating material comprising a cured resin material and an organic polymer material dispersed within the cured resin material.

36. The microelectronic radio frequency communication device of claim 35, wherein the organic polymer material comprises a polymer powder.

37. The microelectronic radio frequency communication device of claim 35, wherein the organic polymer material comprises polytetrafluoroethylene.

38. The microelectronic radio frequency communication device of claim 35, wherein the solid coating is disposed over the entire substrate and effectively seals the semiconductor chip, the antenna, and the battery relative to the substrate.

39. The microelectronic radio frequency communication device of claim 35, the solid coating having a higher degree of frequency transmissivity relative to the desired radio frequency than the solid coating would have without the organic polymer material dispersed therein.

* * * * *

UNITED STATES PATENT AND TRADEMARK OFFICE
CERTIFICATE OF CORRECTION

PATENT NO.  : 6,376,922 B1
DATED       : April 23, 2002
INVENTOR(S) : Rickie C. Lake It is certified that error appears in the above-identified patent and that said Letters Patent is hereby corrected as shown below:

Column 1,
Line 58, replace "radio-frequency characteristics." with -- radio-frequency transmissivity characteristics. --

Column 3,
Line 57, replace "James O'0 Toole," with -- James O'Toole, --

Column 6,
Line 3, replace "equal to 120 C." with -- equal to 120 ºC. --
Line 23, replace "The method of claim 25," with -- The method of claim 26, --

Signed and Sealed this

Twelfth Day of November, 2002

*Attest:*

*Attesting Officer*

JAMES E. ROGAN
*Director of the United States Patent and Trademark Office*